United States Patent
Calmon et al.

(10) Patent No.: US 11,489,761 B2
(45) Date of Patent: Nov. 1, 2022

(54) METHOD AND APPARATUS FOR CODED MULTIPATH NETWORK COMMUNICATION

(71) Applicant: Code On Network Coding, LLC, Cambridge, MA (US)

(72) Inventors: Flavio du Pin Calmon, White Plains, NY (US); Muriel Medard, Belmont, MA (US); Kerim Fouli, Cambridge, MA (US)

(73) Assignee: Code On Network Coding, LLC, Cambridge, MA (US)

( * ) Notice: Subject to any disclaimer, the term of this patent is extended or adjusted under 35 U.S.C. 154(b) by 0 days.

(21) Appl. No.: 16/856,340

(22) Filed: Apr. 23, 2020

(65) Prior Publication Data

US 2021/0336873 A1    Oct. 28, 2021

(51) Int. Cl.
 *H04L 45/24*     (2022.01)
 *H04L 1/00*      (2006.01)
 *H04L 65/1069*   (2022.01)

(52) U.S. Cl.
 CPC ............ *H04L 45/24* (2013.01); *H04L 1/0009* (2013.01); *H04L 65/1069* (2013.01)

(58) Field of Classification Search
 CPC ................ H04L 1/0041; H04L 1/1671; H03M 13/6306; H03M 13/3746; H03M 13/373
 See application file for complete search history.

(56) References Cited

U.S. PATENT DOCUMENTS

| | | | |
|---|---|---|---|
| 8,068,426 B2 | 11/2011 | Sundararajan et al. | |
| 8,130,776 B1 | 3/2012 | Sundararajan et al. | |
| 8,279,781 B2 * | 10/2012 | Lucani | H04L 1/1671 370/461 |
| 8,699,350 B1 | 4/2014 | Kumar et al. | |
| 9,537,759 B2 | 1/2017 | Calmon et al. | |
| 9,877,265 B2 | 1/2018 | Kim et al. | |
| 11,372,394 B2 * | 6/2022 | Celia | G06Q 30/06 |
| 2009/0201899 A1 | 8/2009 | Liu et al. | |
| 2010/0054164 A1 | 3/2010 | Lucani et al. | |
| 2013/0195106 A1 * | 8/2013 | Calmon | H04L 45/24 370/389 |

(Continued)

FOREIGN PATENT DOCUMENTS

| WO | WO 2014/159616 A2 | 10/2014 |
|---|---|---|
| WO | WO 2018/183694 A1 | 10/2018 |

OTHER PUBLICATIONS

U.S. Appl. No. 16/856,480, filed Apr. 23, 2020, Calmon, et al.

(Continued)

*Primary Examiner* — Syed Ali

(74) *Attorney, Agent, or Firm* — Daly, Crowley, Mofford & Durkee, LLP

(57) ABSTRACT

A machine-implemented method for use at a destination node for transferring data from a source node, the method comprising: establishing one or more connections with the source node; sending to the source node a request for a data stream, the request including control information to be applied at the source node, the control information including a number of degrees of freedom (DoFs) or frames to be transmitted across each of the one or more connections; and receiving one or more coded frames through the data stream over the one or more connections.

20 Claims, 3 Drawing Sheets

(56) References Cited

U.S. PATENT DOCUMENTS

| | | | |
|---|---|---|---|
| 2014/0146924 A1 | 5/2014 | Shattil | |
| 2017/0012885 A1 | 1/2017 | Ho | |
| 2017/0070914 A1* | 3/2017 | Chun | H04L 1/0618 |
| 2017/0366270 A1* | 12/2017 | Ashrafi | H04L 27/38 |
| 2018/0138959 A1* | 5/2018 | Chun | H04L 27/2602 |
| 2019/0097754 A1 | 3/2019 | Yu et al. | |
| 2019/0154439 A1* | 5/2019 | Binder | G01B 11/26 |
| 2020/0125509 A1* | 4/2020 | Hegarty | H04L 65/65 |
| 2020/0382198 A1* | 12/2020 | Ashrafi | H04B 7/155 |
| 2020/0389469 A1* | 12/2020 | Litichever | H04L 63/029 |
| 2021/0114616 A1* | 4/2021 | Altman | H04W 36/00837 |
| 2021/0133614 A1* | 5/2021 | Ashrafi | G06N 10/00 |

OTHER PUBLICATIONS

De Coninck, et al., "Multipath Extension for QUIC;" Downloaded from https://tools.ietf.org/id/draft-deconinck-quic-multipath-00.txt; Mar. 5, 2018; 25 Pages.

Huitema, et al., "QUIC Multipath Requirements;" Downloaded from https://tools.ietf.org/id/draft-huitema-quic-mpath-req-01.txt; Jan. 7, 2018; 12 Pages.

Duke, et al., "Quic Status Pages;" Downloaded from https://tools.ietf.org/wg/quic/; Downloaded from https://tools.ietf.org/wg/quic/; Oct. 4, 2016; 2 Pages.

Non-Final Office Action dated Sep. 29, 2021 for U.S. Appl. No. 16/856,480; 22 Pages.

PCT International Search Report and Written Opinion dated Jul. 8, 2021 for Application No. PCT/US2021/028785; 14 Pages.

Chen, et al., "Multiplexing-Diversity Medium Access for Multi-User MIMO Networks;" IEEE Transactions on Mobile Computing, vol. 15, No. 5; May 2016; 12 pages.

PCT International Search Report and Written Opinion dated Jul. 7, 2021 for International Application No. PCT/US2021/028783; 14 pages.

Final Office Action dated Apr. 22, 2021, for U.S. Appl. No. 16/856,480; 8 Pages.

Response to Non-Final Office Action for U.S. Appl. No. 16/856,480, filed Jan. 31, 2022; 22 Pages.

Notice of Allowance dated Jun. 3, 2022 for U.S. Appl. No. 16/856,480; 7 Pages.

Notice of Allowability dated Jun. 17, 2022 for U.S. Appl. No. 16/856,480; 6 Pages.

Response filed May 24, 2022 to Final Office Action dated Apr. 22, 2022 for U.S. Appl. No. 16/856,480; 14 Pages.

Supplemental Notice of Allowability dated Jul. 22, 2022 for U.S. Appl. No. 16/856,480; 14 Pages.

* cited by examiner

METHOD AND APPARATUS FOR CODED MULTIPATH NETWORK COMMUNICATION

BACKGROUND

As is known in the art, there have been several attempts in using multiple paths for transport protocols from a source node to a destination node in a computer network. An example of a multipath protocol is Multi-Path Transmission Control Protocol (MPTCP). MPTCP is one of several multipath protocol implementations proposed by the Internet Engineering Task Force (IETF) working group.

Implementation of multipath protocols such as MPTCP potentially improves the way current computer networks operate by using the resource pooling principle to improve the reliability and throughput of a data communication session. For example, if a communication path between a source and a destination breaks down, or becomes highly congested, data may be sent over alternative paths to thereby avoid any interruption in the data communication session.

Moreover, a multipath protocol potentially enables a client, e.g. a mobile device, to simultaneously establish a connection through multiple network interfaces. Modern communication devices (e.g., smart phones and other hand-held communicators, tablet computers with communication functionality, etc.) often possess multiple network interfaces for use with different network technologies having different connectivity characteristics. Such interfaces can provide connections to a cellular network, wired and wireless Local Area Network (LAN), or other devices in an ad-hoc or peer-to-peer mode. The different network technologies may each have, for example, different delay, throughput, and reliability characteristics. For example, a mobile device that is connected to a remote source node through both a cellular network and an IEEE 802.11 wireless LAN may observe different usage costs and quality of service through the respective interfaces.

A goal of multipath protocols such as MPTCP may be to utilize multiple available paths and network resources to carry out communications, to increase throughput, decrease data transit time, and/or make efficient use of available resources. The desire for such benefits has increased with the emergence of more capable (in terms of computational power and communication interfaces) devices. Existing multipath proposals and implementations are limited in one or more respects. For example, one problem in MPTCP is scheduling. The problem of scheduling in MPTCP involves partitioning the data across multiple paths, and dynamically re-adjusting the schedule based upon congestion feedback.

The use of coding in general, specifically Random Linear Network Coding (RLNC), has been proposed to alleviate the scheduling problem of multipath communication. U.S. Pat. No. 9,877,265 ("'265 patent") describes techniques to facilitate multi-path transmission by implementing a transport protocol that emulates current Transfer Control Protocol (TCP)/MPTCP interface (to higher and lower layers) and provides a more effective service using coding. U.S. Pat. No. 9,537,759 ("'759 patent") describes, in certain embodiments, using RLNC in a manner that takes advantage of conventional communication techniques and protocols, providing robustness to link failures particularly in wireless networks as well as the ability to roam from one network to another. For example, the '759 patent describes embodiments that can operate over conventional transport layer protocol (e.g., TCP). Both the '265 and '759 patents are incorporated herein by reference in their entirety.

As is also known in the art, there exist transport-layer protocols that are designed to operate over UDP (User Datagram Protocol). One such protocol is QUIC, which was primarily designed to reduce latency through (1) the removal of head-of-line blocking seen by Transmission Control Protocol (TCP) by establishing a set of multiplexed connections between the endpoints, (2) an improved estimation of congestion, and (3) the inclusion of a form of forward error correction (FEC). The word "QUIC" is sometimes used as an acronym for "Quick UDP Internet Connections," however the IETF uses "QUIC" as a protocol name, not an acronym.

The extension of QUIC to multipath operation has been proposed. See, for example, Q. De Coninck, O. Bonaventure, "Multipath Extension for QUIC," Internet Draft, Oct. 30, 2017 (hereinafter "De Coninck"). A subsequent informational Internet Draft summarizes a set of suggested multipath requirements for QUIC, see C. Huitema, "QUIC Multipath Requirements," Internet Draft, Jan. 7, 2018 (hereinafter "Huitema"). De Coninck proposes a congestion control mechanism that is managed individually at the path level, where a handshake is provisioned for establishing multipath connection. As suggested in Huitema, De Coninck allows path-independent acknowledgements (i.e., feedback) to be transmitted between the endhosts (i.e., the source and the destination nodes). De Coninck proposes additional protocol features, such as path update frames, path state management, and an acknowledgement format, and provides for the collection of path statistics by the endhosts for flow control purposes. Both De Coninck and Huitema are incorporated herein by reference in their entirety.

SUMMARY

According to one aspect of the present disclosure, a machine-implemented method can be used at a destination node for transferring data from a source node. The method can include: establishing one or more connections with the source node; sending to the source node a request for a data stream, the request including control information to be applied at the source node, the control information including a number of degrees of freedom (DoFs) or frames to be transmitted across each of the one or more connections; and receiving one or more coded frames through the data stream over the one or more connections.

In some embodiments, each connection of the one or more connections can be associated with a network path between the source node and the destination node, wherein the control information includes at least one of the following quantities to be transmitted by the source node: a number of DoFs or frames associated with the stream, or a number of DoFs or frames associated with a network path with which the one or more connections is associated. In some embodiments, the method can include: generating a stream-level DoF window; generating a connection-level DoF window; and in response to receiving the one or more coded frames, removing decoded or received frames from the stream-level and connection-level DoF windows. In some embodiments, the coded frames may be coded by the source node using random linear network coding (RLNC) or a structured code. In some embodiments, the control information can include at least one of: a stream-level code rate, a maximum stream-level DoF window size, a path-level code rate, a connection-level code rate, or a maximum connection-level DoF window size. In some embodiments, the control information can include at least one of the following actions to be performed by the source node: creating redundancy for a specific range, creating redundancy for a subset of frames, modifying a code rate, modifying a source-level DoF window size, establishing a connection, terminating a connection, establishing a path, or terminating a path.

In some embodiments, the method can include determining the control information based on stream-level, path-level, or connection-level performance metrics computed or collected by the destination node. In some embodiments, the method can include sending to the source node a plurality of DoF acknowledgement (ACKs), wherein the plurality of DoFs ACKs include at least one stream-level DoF ACK and at least one connection-level DoF ACK. In some embodiments, at least one of the plurality of DoF ACKs may be included within the request for the data stream. In some embodiments, the method can include decoding the one or more coded frames at a decoding stage associated with one of the one or more connections. In some embodiments, the control information can specify coded or non-coded paths.

According to another aspect of the present disclosure, a machine-implemented method can be used at a source node for transferring data to a destination node. The method can include: establishing one or more connections with the destination node; receiving, from the destination node, a request for a data stream, the request including control information to be applied at the source node, the control information including a number of degrees of freedom (DoFs) or frames to be transmitted across each of the one or more connections; and in response to the request, generating and sending one or more coded frames through the data stream over the one or more connections.

In some embodiments, each connection of the one or more connections may be associated with a network path between the source node and the destination node, and the control information can include at least one of the following quantities to be transmitted by the source node: a stream-level number of DoFs or frames, a path-level number of DoFs or frames, a connection-level number of DoFs or frames, wherein sending the one or more coded frames includes sending the stream-level, path-level, or connection-level number of DoFs or frames across each of the one or more connections. In some embodiments, the method can include receiving from the destination node a plurality of DoF acknowledgement (ACKs), wherein the plurality of DoFs ACKs include at least one stream-level DoF ACK and at least one connection-level DoF ACK.

In some embodiments, the method can include: generating a stream-level DoF window; generating a connection-level DoF window; and in response to receiving the plurality of ACKs, removing frames from the stream-level and connection-level DoF windows. In some embodiments, generating the one or more coded frames can include generating the one or more coded frames using random linear network coding (RLNC) or a structured code. In some embodiments, the control information may include a stream-level code rate, a path-level code rate, or a connection-level code rate, wherein generating and sending the one or more coded frames comprises generating the one or more coded frames according to the stream-level code rate, the path-level code rate, or the connection-level code rate. In some embodiments, the control information comprises a maximum DoF window size. In some embodiments, the method can include: generating a stream-level DoF window; generating a connection-level DoF window; and removing acknowledged, decoded, received, or seen frames from the stream-level DoF window and the connection-level DoF window; and updating the maximum size of the source-level DoF window or the stream-level DoF window.

In some embodiments, the method can include encoding the one or more coded frames at an encoding stage associated with one of the one or more connections. In some embodiments, the control information may specify coded or non-coded paths.

According to another aspect of the present disclosure, a device for use at a destination node for transferring data from a source node can include a processor and a non-volatile memory storing computer program code. The computer program code, when executed on the processor, may cause the processor to execute a process operable to: establish one or more connections with the source node; send to the source node a request for a data stream, the request including control information to be applied at the source node, the control information including a number of degrees of freedom (DoFs) or frames to be transmitted across each of the one or more connection; and receive one or more coded frames through the data stream over the one or more connections.

According to another aspect of the present disclosure, a device for use at a source node for transferring data to a destination node can include a processor and a non-volatile memory storing computer program code. The computer program code, when executed on the processor, can cause the processor to execute a process operable to: establish one or more connections with the destination node; receive, from the destination node, a request for a data stream, the request including control information to be applied at the source node, the control information including a number of degrees of freedom (DoFs) or frames to be transmitted across each of the one or more connections; and in response to the request, generate and send one or more coded frames through the data stream over the one or more connections.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

The present disclosure relates to methods and devices to enhance multipath communications using coding. Embodiments of the present disclosure can achieve coded multipath transport through a multi-window design where the source and destination nodes maintain a destination-driven sliding sub-window associated with each path. In some embodiments, a multi-window pull mechanism can be used in protocols that are the same as or similar to the QUIC transport-layer protocol. While the multi-window design disclosed here may use the QUIC protocol as a template, the techniques described herein may be applied to other transport protocols.

Figure 1:
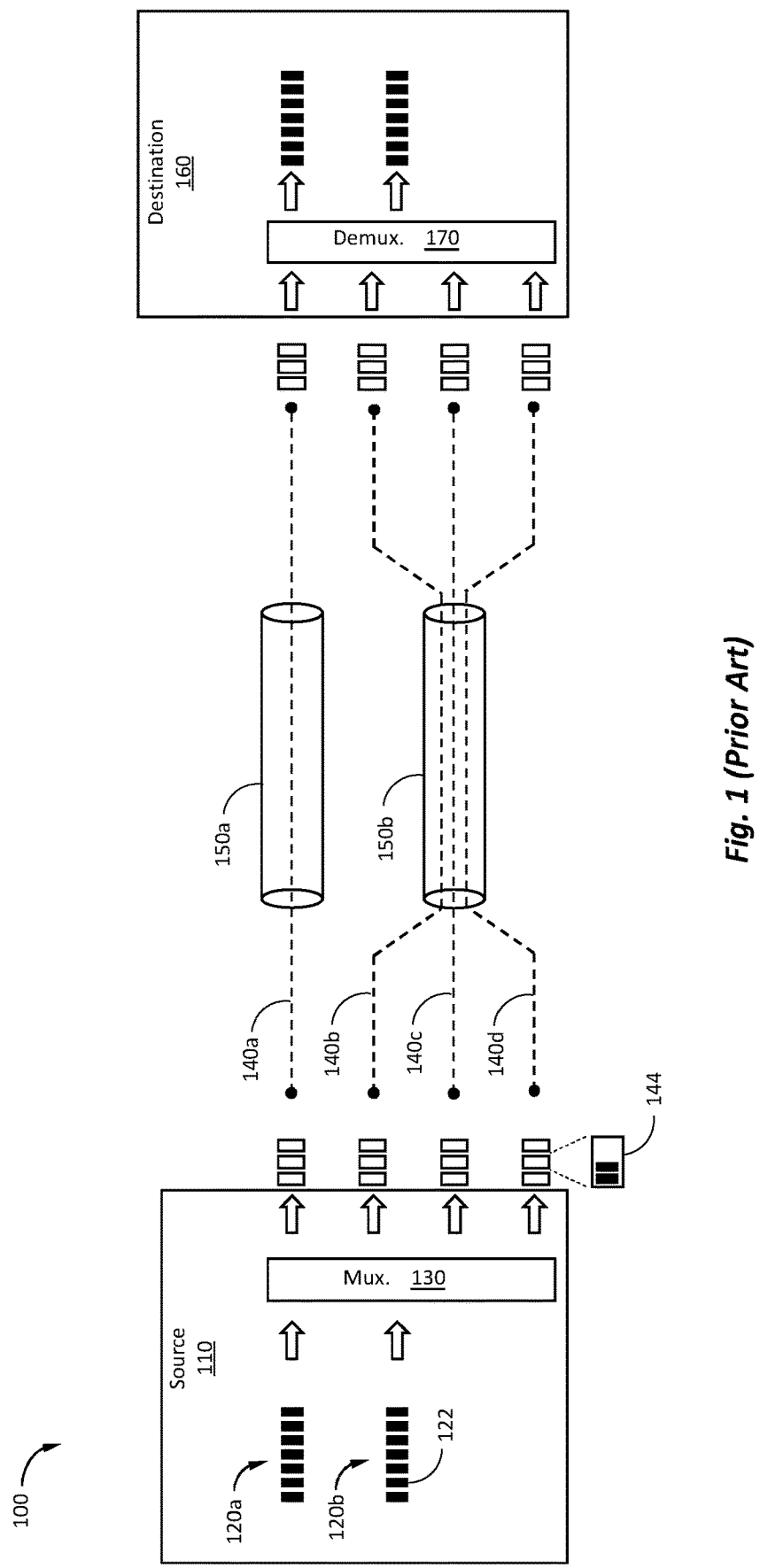
FIG. 1 is a network diagram illustrating prior art multipath QUIC communication.

FIG. 1 illustrates multipath QUIC communication in a computer network 100, as known in the prior art. A source (or "sender") 110 can be communicatively coupled to a destination (or "receiver") 160 via a plurality of paths 150a, 150b, etc. (150 generally). A path 150 may correspond to a logical association between the source 110 and the destination 160. Multiple paths 150 may exist between the source and the destination. For example, paths from a video server to a smartphone can be established via different radio interfaces such as WiFi and LTE. The example of FIG. 1 includes two paths 150a, 150b.

The source 110 and destination 160 may correspond to the endhosts (or "hosts") of a transport operation, performing multiplexing and encapsulation operations required at the transport layer. As shown in FIG. 1, multiplexing may be performed by way of a multiplexer 130 at the source 110 and a demultiplexer 170 at the destination 160. The source 110 and destination 160 may also perform flow control and reliability operations.

Multiple data streams 120a, 120b, etc. (120 generally) can be established between the source 110 and the destination 160. A data stream (or "stream") 120 can be used to transmit application data from the source 110 to the destination 160. In the example of FIG. 1, source 110 is shown sending two data streams 120a, 120b to the destination 160. Each stream 120 may be segmented or mapped into one or more frames (e.g., frame 122). Frames from different streams 120 can be multiplexed together and formed into packets (e.g. packet 144) and transmitted across one or more of the paths 150. Frames and packets can also carry control information.

One or more connections 140a, 140b, 140c, 140d, etc. (140 generally) can be established between the source 110 and the destination 160, with each connection associated with a given path 150. A connection 140 can carry packets between the source 110 and the destination 160 and may be characterized by different properties such as error rate, delay, encryption requirements, reliability, etc. In the example of FIG. 1, a first path 150a has one connection 140a whereas a second path 150b has three connections 140b, 140c, 140d.

Data flow in transport protocols typically starts with a request from the destination 160, usually in the form of a number of octets (or bytes). Such requests typically follow a credit-based flow control protocol, examples of which include QUIC and Hypertext Transfer Protocol 2.0 (HTTPS/2). In such protocols, credits represent permissions to transmit a given number of octets.

Transport protocols such as TCP and QUIC typically rely on a sliding-window at both the source 110 and destination 160 to track sent and received frames (or packets). At the source 110, feedback from the destination 160 in the form of packet acknowledgements (ACKs), coupled with transmission credits, enable the source 110 to remove frames from its window, thus allowing it to insert new frames from the stream, slide the window, and carry on with the transmission. The destination 160 inserts received frames into its window and typically removes them when they are transmitted in order to a stream-requesting application.

Figure 2:
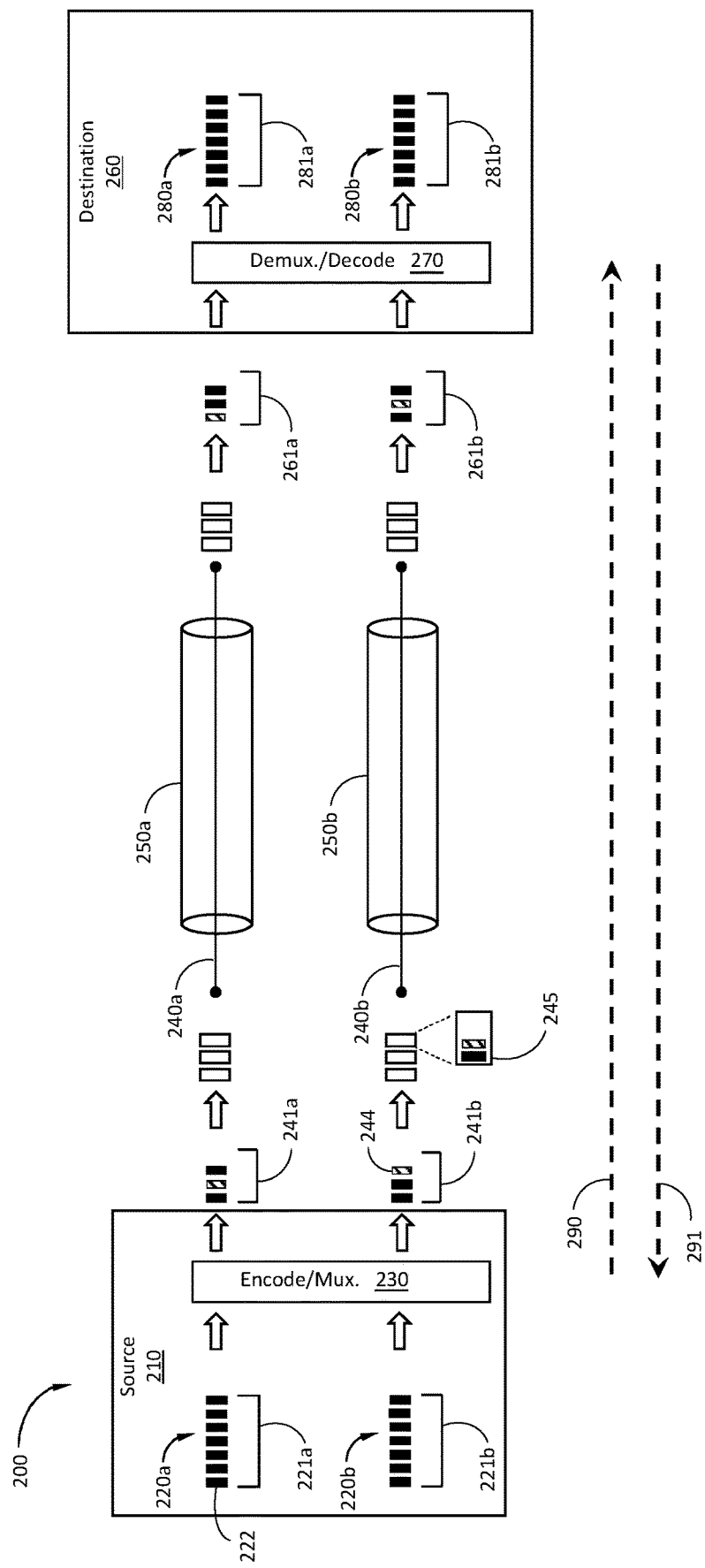
FIG. 2 is a network diagram illustrating coded multipath network communication, according to embodiments of the present disclosure.

Turning to FIG. 2, coded transport protocols such as the ones described in the '265 and '759 patents carry out the coding of data units (e.g., frames or packets) to enable multipath operation and improve reliability. Such coded protocols are able to introduce redundant erasure-correcting data units (redundancy) at any node in the network (e.g., at a data "chokepoint") and, as such, can be used to achieve a desired coding rate for a stream or connection.

Coded transport protocols use the notion of coded degrees of freedom (DoFs), where DoFs are transport data units that are useful for the decoding operation. In this disclosure, the term degree of freedom (DoF) is used to denote a coded or uncoded (i.e., native) data unit. In RLNC, a coded data unit is a linear combination of uncoded data units. A DoF window, or coding window, can be utilized by a source to control the amount of data it codes together at any given time, and at a destination to collect received packets and carry out decoding operations, such as described in the '265 and '759 patents.

A DoF window is defined by the DoFs (i.e., coded and uncoded frames) contained within the window, where each uncoded frame may be viewed as a linear combination involving data units within a single frame. Since each frame can be represented by a coefficient array, a DoF window can be represented by a matrix of coefficients of its constituent frames, with the rows representing sent or received DoFs and the columns representing uncoded frames (see, e.g., the '265 and '759 patents).

The transmission of DoFs, such as described in the '265 and '759 patents, can be carried out through a push mechanism, where the size of the source's DoF window is determined by the source. The present disclosure exploits destination requests temporally to generate a decodable transmission through a pull mechanism.

In such requests, the destination can announce to the source one or more coding-related parameters. For example, the destination can send a request to the source specifying a number of coded degrees of freedom (DoFs) and/or the number of frames that the destination is willing to receive per stream, per path, and per connection. In some embodiments, the destination may send an updated request to the source as packets are received and decoded, as long as the transmission is not terminated. In some embodiments, transmission paths may be updated based on receiver requirements and observed connection statistics.

Using the techniques disclosed herein, a destination can ensure decodability through its requests to the source. In some embodiments, decodable transmissions may be self-contained so that decoding can occur in a relatively short period of time (in contrast with a conventional "globally decodable" approaches where decodability is not required from each transmission).

A destination's request for data can include information about the amount of coded data it is willing to receive, and additional parameters described below. A destination can request maximum degree of freedom (DoF) windows to the source, where a maximum DoF window is a number of frames (or other units of data) it is willing to receive. In addition to the DoF window specific to each stream, each connection may have a unique DoF window (referred to as a sub-window), resulting in multiple DoF windows per data transmission session. The destination's request may also include the overall amount of data (e.g., number of frames or octets) it can receive (e.g., as specified by QUIC), as well as potential Quality of Service (QoS) requirements. Such QoS requirements may include temporal restrictions for decoding (e.g., decoding deadlines). The maximum DoF window may also capture the total amount of data (e.g., number of frames or octets) that the destination can process, hence reflecting the decoding capabilities of the destination. The destination may increase the DoF window per stream, per connection and/or per path in order to allow for more data to be transmitted.

The methods described herein include the use of path-agnostic and path-specific DoF ACKs and a destination-side credit-based sliding DoF window. In this disclosure, the destination monitors transmission statistics and requests the source to adjust its coding window and scheme accordingly (e.g., modification of the code rate). This adjustment can be made for transmissions over a single path, or across multiple paths between the source and destination.

The destination acknowledges (ACKs) received DoFs. This acknowledgment can be sent per connection (connection-specific), or at the stream level. Stream-level ACKs are path-agnostic and can be sent via return frames over any path established between the source and the destination. Frames produced by a single stream may therefore be encoded with different levels of redundancy depending on the connection they use.

In addition to the DoF window, the destination may request redundancy requirements based on connection statistics (e.g., packet or frame loss rates) and the coding rate to be used by the sender. The coding rate may be determined by resource constraints available at the receiver (e.g., memory availability, processor power, battery) and QoS requirements (e.g., delay, time to decode, jitter). The destination request may also specify the redundancy or the coding rate.

The destination uses information available locally in order to determine connection statistics and build its requests to the source. Such information may include monitoring of device resources (e.g., memory, processing capabilities), channel state information, path state information, congestion information, and user input constraints (e.g., pause in application usage). Such information may further include congestion level, packet/frame loss, packet/frame delay, throughput, application/network QoS requirements (e.g., time to decode, packet/frame delay/jitter), node memory size (e.g., coding/decoding buffer size, receiver buffer size), processor power (e.g., coding/decoding speed), or any stream-, path, or connection-level performance metrics computed or collected by the destination. A destination may establish or terminate connections over existing or new paths, terminate existing paths, and adjust the DoF window size and sender coding scheme (e.g., code rate) based on such information.

The destination coordinates with the source two levels of redundancy: a connection-level redundancy, determined per connection and managed by the connection-level DoF window, and a stream-level of redundancy across multiple connections via multiplexing of encoded stream frames and managed by a stream-level DoF window.

The methods described herein are compatible with flow-control algorithms that govern the amount of data (e.g., number of frames or octets) the source is allowed to transmit at any time across any given stream and/or connection. The focus is rather on a coding-based approach to multipath operation and reliability.

FIG. 2 illustrates coded multipath network communication using multi-window operation, according to an embodiment of the current disclosure. An illustrative computer network 200 can include a source 210 and a destination 260 communicatively coupled by a plurality of paths 250a, 250b, etc. (250 generally), according to an embodiment of the present disclosure. The example of FIG. 2, the network 200 includes two paths 250a, 250b, however it will be understood that the techniques disclosed herein can be used with more than two paths. The paths 250 may include wireless paths (e.g., paths over WiFi and LTE), wired paths (e.g., Ethernet paths), and/or a combination of wireless and wired paths.

The source 210 may include an encoder-multiplexer 230 configured to perform encoding and multiplexing operations as discussed herein. The destination 260 may include a demultiplexer-decoder 270 configured to perform corresponding demultiplexing and decoding operations.

One or more data streams 220a, 220b, etc. (220 generally) can be established between the source 210 and the destination 260. A stream 220 can correspond to a logical connection between the source 210 and the destination 260 across which data is transmitted for an application. A stream 220 may be segmented or mapped into one or more frames (e.g., frame 222). While two streams 220a, 220b are shown in FIG. 2, the techniques and structures disclosed herein can be applied to an arbitrary number of streams.

One or more connections 240a, 240b, etc. (240 generally) can be established between the source 210 and the destination 260, with each connection associated with a given path 250. A connection 240 can carry packets between the source 210 and the destination 260 and may be characterized by different properties such as error rate, delay, encryption requirements, reliability, etc. In the example of FIG. 2, a first connection 240a is established over path 250a and a second connection 240b is established over path 250b. In some embodiments, multiple connections 240 may be established over a single path 250.

Frames from the one or more streams 220 can be encoded and multiplexed onto the one or more connections 240 by encoder-multiplexer 230. For each stream 220a, 220b, the source 210 can maintain a corresponding "stream-level" DoF window 221a, 221b (221 generally). The source may encode frames present in the stream-level DoF window 221 to generate redundant coded frames (e.g., frame 244). In FIG. 2, coded frames are shown using hatching, whereas uncoded frames are shown in solid fill. Coding may be performed on the frames of each stream 220 using, for example, network coding, with coding coefficients generated either randomly or using a structured code.

The source 210 may inject the redundant coded frames (e.g., frame 244) into the multiplexed stream of uncoded frames, and the coded and uncoded frames may be formed into packets (e.g., packet 245). For each connection 240a, 240b, the source can maintain a respective "connection-level" DoF window 241a, 241b (241 generally). The connection-level DoF windows 241 may be referred to as sub-windows, since they contain representations of data that are already in the stream-level DoF window 221.

The destination 260 can also maintain connection-level DoF windows 261a, 261b (261 generally), which mirror the source's connection-level DoF windows 241a, 242b. The connection-level DoF windows 261 at the destination allow the destination to monitor the arrival of DoFs over each connection 240. The destination 260—or more particularly, demultiplexer-decoder 270—can demultiplex and decode data received over each of the connections 240 to generate received streams 280a, 280b (280 generally). Received streams 280a, 280b may correspond to source streams 220a, 220b, respectively.

For each received stream 280a, 280b, the destination 260 can maintain a corresponding stream-level DoF window 281a, 281b. The destination 260 can use the stream-level DoF windows 281 to monitor DoFs in the received streams 280 and to carry out stream decoding. In some embodiments, stream-level DoF windows 281 may be maintained by the demultiplexer-decoder 270.

In FIG. 2, dashed arrow 290 shows the direction of flow of DoFs from the source 210 to the destination 260. Each DoF can correspond to a stream and connection identifiers. Dashed arrow 291 shows the direction of flow of control information from the destination 260 to the source 210. Control information can include, for example, DoF acknowledgements (ACKs) and maximum DoF window size updates.

In some embodiments, control-plane signaling may be used between the source 210 and destination 260. For example, the destination 260 may send control frames or packets to the source 210 to perform stream initialization (e.g., initial data requests), DoF ACKs, and maximum DoF window size requests. In some embodiments, a destination may "update" or "announce" new maximum DoF window sizes to the sender as part of a data request. A maximum DoF window size requests can identify a specific stream 220, path 250, or connection 240.

For example, upon detecting an increase in the losses over second path 250b, the destination 260 may increase the source's DoF windows for all connections carried by the second path 250b. Thus, in the example of FIG. 2, destination 260 may send a request to increase the maximum size of DoF window 241b, but not of DoF window 214a. The destination may also request an increase in the maximum size of the stream-level DoF window 221. By requesting an increase in the maximum DoF window sizes, destination 260 can induce the source 210 to send more DoFs over the second path 250b to compensate for the added losses. In some embodiments, the destination 260 may take into account flow control credits available for each path 250 and/or each connection 240 in order to determine an appropriate size for the connection-level DoF windows 241 and/or for the stream-level DoF window 221.

The amount of redundancy in each stream and connection can be implicitly dictated by the destination 260 through the maximum DoF window size requests. However, redundancy levels may also be set through the addition of explicit stream-level or connection-level code rate fields to the control frames (e.g., ACKs or updates) that are sent from the destination to the source.

In some embodiments, a second coding stage may be implemented at the source connection endpoints (e.g., 240a, 240b) to create connection-specific redundancy, similar to embodiments described in the '759 patent. This second connection-level coding stage may be implemented before or after the encapsulation of frames into packets, leading to coding at the frame level or at the packet level, respectively. A separate decoding stage that mirrors the source's connection-level coding stage may be implemented at the destination connection endpoints.

Figure 3:
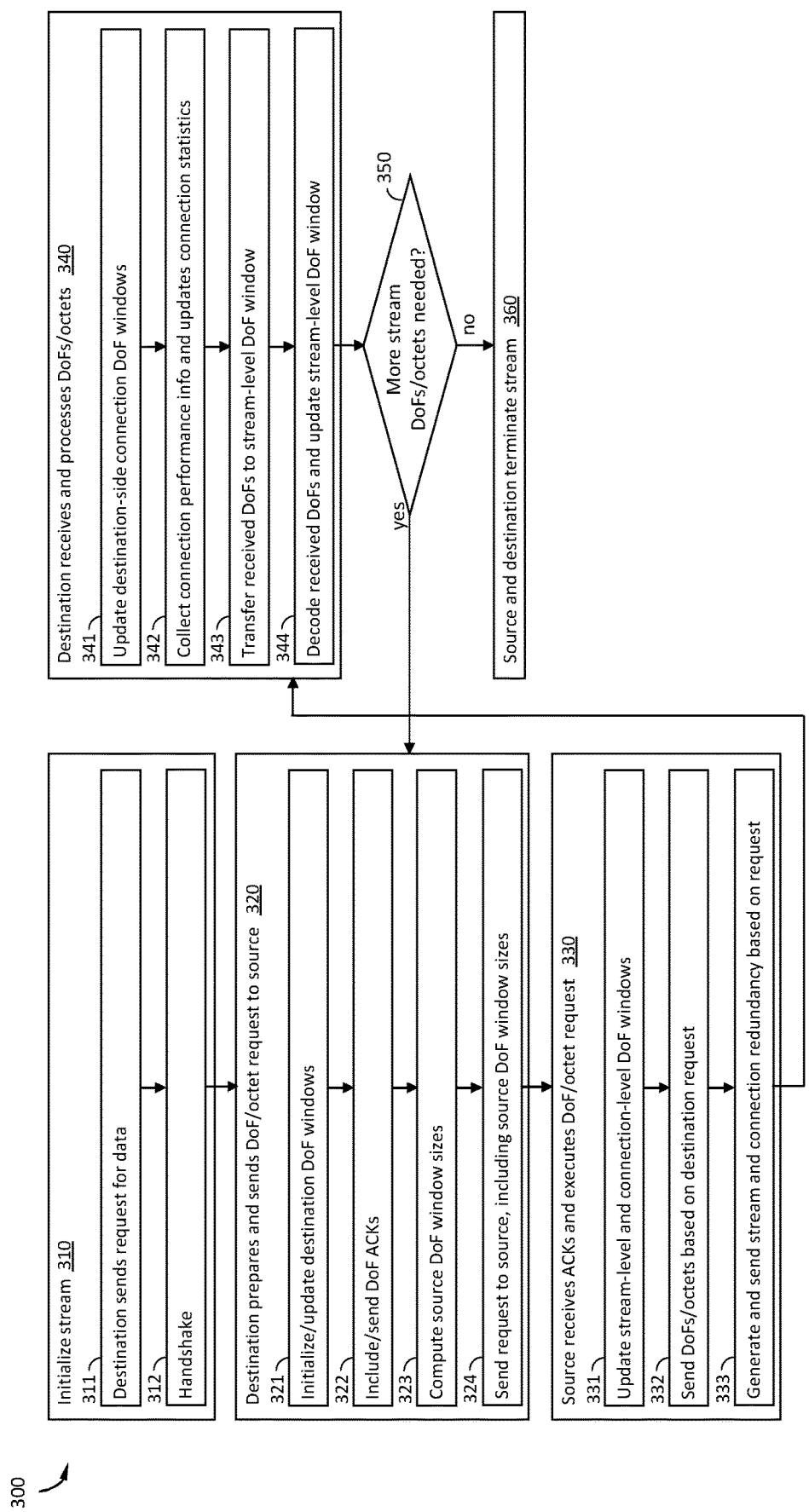
FIG. 3 is a flow diagram illustrating coded multipath network communication, according to embodiments of the present disclosure.

Referring to FIG. 3, an illustrative method 300 can be used for coded multipath communication within a computer network (e.g., network 200 of FIG. 2), according to embodiments of the present disclosure. The method 300 can be implemented, in full or in part, within a source (e.g., source 210 of FIG. 2) or a destination (e.g., destination 260 in FIG. 2).

At block 310, a stream is initialized between the source and destination. This can include the destination sending a request for data (311) followed by a handshake (312) between the source and destination to setup at least one stream. While the example of FIG. 3 may refer to a single stream, it should be understood that multiple streams could be set up through the same handshake. The initialization handshake (312) may also include setting up one or more connections associated with the stream, where each up connection is associated with a specific path (e.g., a path 250 in FIG. 2).

At block 320, once the destination has established connections associated with the stream, it can prepare and send a data request to the source. The request can include an announcement of the maximum allowed DoF windows for the stream and its associated connections. This step can include an initialization of stream-level and connection-level DoF windows at the destination (321). As show in FIG. 3, block 320 can be repeated in a loop as additional data (e.g., new DoFs, frames, octets, etc.) are received. As new DoFs are received, the destination may update its stream-level and connection-level DoF windows (321). In some embodiments, step 321 may involve decoding. The destination also sends frame ACKs or includes them in the data request to be sent to the source (322). The destination may also compute new maximum DoF window sizes to be used by the source (323). The computed source DoF window sizes may be included in the data request. This allocation (323) may involve multiple considerations such as code rate adjustments and flow control operations based on connection and path statistics, as previously discussed. The destination then sends the request to the source (324).

At block 330, the source can receive and execute the data request. This may include updating the source stream-level and/or connection-level DoF windows based on received ACKs (331). Based on the ACKs, the source can remove frames that are no longer "useful" from the source's stream-level and connection-level DoF windows. A frame is deemed not "useful" if the destination has confirmed that the frame has been seen, received, or decoded, or if the frame is a coded representation of seen/received/decoded frames. If the DoF request includes new DoF window sizes, the source also adjusts its stream-level and connection-level DoF window sizes (331). The source proceeds to send data based on the request (332). The source may inject redundant coded packets into the transmission, at the level of the stream and/or at the level of a connection. In some embodiments, the source injects redundant coded packets based on the request from the destination (333).

At block 340, the destination receives and processes the data (e.g., the DoFs, frames, octets, etc.). This can include updating the destination-side connection DoF windows (341) in a manner similar to that described above for step 321. The destination can collect connection performance information and use this information to update connection, path, and stream statistics (e.g., path/connection loss). The destination can transfer the received DoFs to the stream-level DoF window (343) and update the stream-level DoF window, which may involve decoding received DoFs (344).

At block 350, once the destination processes its received data, a decision can be made as to whether the stream should be terminated (block 360) or whether additional data are required. If additional data are required, the method 300 may repeat from block 320.

It will be appreciated that, using method 300, as data transmission is carried out, the destination may adjust the source's maximum DoF window sizes at any time based on received DoFs, the flow control mechanism, and other available information (e.g., path/connection loss rates).

Note that the order of described operations within the main steps (i.e., 310, 320, 330, 340) is not specified and may be modified with the protocol implementation.

In certain embodiments, a data request sent by the destination can specify linear combinations of the data to be received (e.g., range/subset of frames to be combined, combine multiple frames from different streams, etc.). In some embodiments, the request may specify one or multiple paths over which coded frames will be transmitted. Frames produced by a single stream may be multiplexed across different connections over different paths. A destination may request the source to change the paths used by a stream by adjusting the maximum DoF window size, or by sending additional requests.

In some embodiments, a destination may request the sender to encode multiple streams together in order to have streams share their redundancy. The jointly encoded streams, in turn, may be transmitted through multiple connections across different paths. This may lead to robustness against individual path fluctuations. For example, using the same stream code rates, combining stream redundancies may lead to the ability to withstand larger burst losses on any individual path. Sharing stream redundancy also has potential security benefits, since an adversary needs to observe more streams and potentially more paths in order to recover any of the transmitted streams. It will be appreciated that sharing stream redundancy is optional and, in some embodiments, may be avoided in order to reduce complexity.

In some embodiments, coded frames from one or more streams can be recoded together using, e.g., a RLNC-based recoding technique. The recoding can occur at an intermediate node in the network, and then recoded frames can be transmitted to a destination node or another intermediate node in the network.

A destination may request the source to use one or more paths across which non-coded protocols will be used (e.g., one path uses coded QUIC, another path uses conventional QUIC). The receiver can negotiate with the sender which paths should be coded or non-coded and adjusts the encoding/decoding process accordingly. This mechanism allows for the coding endhosts to support legacy paths.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A machine-implemented method for use at a destination node for transferring data from a source node, the method comprising:
   generating a stream-level degree of freedom (DoF) window for a data stream;
   establishing one or more connections with the source node, each connection of the one or more connections is associated with one of one or more network paths between the source node and the destination node;
   generating one or more connection-level DoF windows for the one or more connections;
   sending to the source node a request for the data stream, the request specifying at least a number of DoFs or frames to be transmitted across ones of the one or more connections and a number of DoFs or frames to be transmitted for the data stream;
   receiving one or more coded frames through the data stream over the one or more connections;
   in response to receiving the one or more coded frames:
      removing one or more frames from the stream-level DoF window or from the one or more connection-level DoF windows;
      monitoring performance metrics for the data stream and for the one or more network paths; and based on the monitoring, sending another request to the source node to change a size of a stream-level DoF window and a size of an at least one connection-level DoF window used by source node to generate coded frames; and sending to the source node a plurality of DoF acknowledgement (ACKs), wherein the plurality of DoFs ACKs include at least one stream-level DoF ACK and at least one connection-level DoF ACK, wherein at least one of the plurality of DoF ACKs is included within the request for the data stream.

2. The method of claim 1, wherein the coded frames are coded by the source node using random linear network coding (RLNC) or a structured code.

3. The method of claim 1, wherein the another request specifies at least one of the following to be used by the source node:
a stream-level code rate,
a maximum stream-level DoF window size,
a path-level code rate,
a connection-level code rate, or
a maximum connection-level DoF window size.

4. The method of claim 1, wherein the another request specifies at least one of the following actions to be performed by the source node:
creating redundancy for a specific range,
creating redundancy for a subset of frames,
modifying a code rate,
modifying a source-level DoF window size,
establishing a connection,
terminating a connection,
establishing a path, or
terminating a path.

5. The method of claim 1, wherein the performance metrics include stream-level, path-level, or connection-level performance metrics computed or collected by the destination node.

6. The method of claim 1, comprising decoding the one or more coded frames at a decoding stage associated with one of the one or more connections.

7. The method of claim 1, wherein the another request specifies coded or non-coded paths to be used by the source node.

8. The method of claim 1, comprising sending to the source node a DoF acknowledgement (ACK) corresponding to a stream-level DoF ACK, a connection-level DoF ACK, or both a stream-level and a connection-level DoF ACK.

9. A machine-implemented method for use at a source node for transferring data to a destination node, the method comprising:
generating a stream-level degree of freedom (DoF) window for a data stream;
establishing one or more connections with the destination node, each connection of the one or more connections is associated with one of one or more network paths between the source node and the destination node;
generating one or more connection-level DoF windows for the one or more connections;
receiving, from the destination node, a request for the data stream, the request specifying at least a number of DoFs or frames to be transmitted across the one or more connections and a number of DoFs or frames to be transmitted for the data stream;
in response to the request, generating and sending one or more coded frames through the data stream over the one or more connections, the generating of the one or more coded frames involving use of the stream-level DoF window and at least one of the one or more connection-level DoF windows;
receiving, from the destination node, another request to change a size of the stream-level DoF window and a size of at least one of the one or more connection-level DoF windows, the another request received in response to the destination node monitoring performance metrics for the data stream and for the one or more network paths;
in response to receiving the another request, changing the size of the stream-level DoF window and the size of the at least one of the one or more connection-level DoF windows; and
receiving, from the destination node, a plurality of DoF acknowledgement (ACKs), wherein the plurality of DoFs ACKs include at least one stream-level DoF ACK and at least one connection-level DoF ACK, wherein at least one of the plurality of DoF ACKs is included within the request for the data stream.

10. The method of claim 9, wherein the another request specifies at least one of the following quantities to be transmitted by the source node:
a stream-level number of DoFs or frames corresponding to the number of DoFs or frames to be transmitted for the stream,
a path-level number of DoFs or frames corresponding to the number of DoFs or frames to be transmitted across the network path,
a connection-level number of DoFs or frames,
wherein sending the one or more coded frames includes sending the stream-level, path-level, or connection-level number of DoFs or frames across each of the one or more connections.

11. The method of claim 10, wherein the another request specifies coded or non-coded paths.

12. The method of claim 9, comprising:
in response to receiving the plurality of ACKs, removing frames from the stream-level and connection-level DoF windows.

13. The method of claim 9, wherein generating the one or more coded frames comprises generating the one or more coded frames using random linear network coding (RLNC) or a structured code.

14. The method of claim 9, wherein the request comprises a stream-level code rate, a path-level code rate, or a connection-level code rate, wherein generating and sending the one or more coded frames comprises generating the one or more coded frames according to the stream-level code rate, the path-level code rate, or the connection-level code rate.

15. The method of claim 9, wherein the another request comprises a maximum DoF window size.

16. The method of claim 15, comprising:
removing acknowledged decoded, received, or seen frames from the stream-level DoF window and the at least one of the one or more connection-level DoF windows; and
updating the maximum size of the stream-level DoF window or the at least one of the one or more connection-level DoF windows.

17. The method of claim 9, comprising encoding the one or more coded frames at an encoding stage associated with one of the one or more connections.

18. The method of claim 9, comprising receiving from the destination node a DoF acknowledgement (ACK) corresponding to a stream-level DoF ACK, a connection-level DoF ACK, or both a stream-level and a connection-level DoF ACK.

19. A device for use at a destination node for transferring data from a source node, the device comprising:

a processor; and a non-volatile memory storing computer program code that when executed on the processor causes the processor to execute a process operable to:

generate a stream-level degree of freedom (DoF) window for a data stream;

establish one or more connections with the source node, each connection of the one or more connections is associated with one of one or more network paths between the source node and the destination node;

generate one or more connection-level DoF windows for the one or more connections;

send to the source node a request for the data stream, the request specifying at least a number of DoFs or frames to be transmitted across the one or more-connections and a number of DoFs or frames to be transmitted for the data stream;

receive one or more coded frames through the data stream over the one or more connections;

in response to receiving the one or more coded frames:

remove one or more frames from the stream-level DoF window or from the one or more connection-level DoF windows;

monitor performance metrics for the data stream and for the one or more network paths; and based on the monitoring, send another request to the source node to change a size of a stream-level DoF window and a size of an at least one connection-level DoF window used by source node to generate coded frames; and send to the source node a plurality of DoF acknowledgement (ACKs), wherein the plurality of DoFs ACKs include at least one stream-level DoF ACK and at least one connection-level DoF ACK, wherein at least one of the plurality of DoF ACKs is included within the request for the data stream.

20. A device for use at a source node for transferring data to a destination node, the device comprising:

a processor; and a non-volatile memory storing computer program code that when executed on the processor causes the processor to execute a process operable to:

generate a stream-level degree of freedom (DoF) window for a data stream;

establish one or more connections with the destination node, each connection of the one or more connections is associated with one of one or more network paths between the source node and the destination node;

generate one or more connection-level DoF windows for the one or more connections;

receive, from the destination node, a request for the data stream, the request specifying at least a number of DoFs or frames to be transmitted across ones of the connections and a number of DoFs or frames to be transmitted for the data stream;

in response to the request, generate and send one or more coded frames through the data stream over the one or more connections, the generating of the one or more coded frames involving use of the stream-level DoF window and at least one of the one or more connection-level DoF windows;

receive, from the destination node, another request to change a size of the stream-level DoF window and a size of at least one of the one or more connection-level DoF windows, the another request received in response to the destination node monitoring performance metrics for the data stream and for the one or more network paths;

in response to receiving the another request, change the size of the stream-level DoF window and the size of the at least one of the one or more connection-level DoF windows; and receive, from the destination node, a plurality of DoF acknowledgement (ACKs), wherein the plurality of DoFs ACKs include at least one stream-level DoF ACK and at least one connection-level DoF ACK, wherein at least one of the plurality of DoF ACKs is included within the request for the data stream.

* * * * *